United States Patent
Shih et al.

(10) Patent No.: US 6,731,352 B2
(45) Date of Patent: May 4, 2004

(54) METHOD FOR FABRICATING LIQUID CRYSTAL DISPLAY

(75) Inventors: Chu-Jung Shih, Taipei (TW); Gwo-Long Lin, Hsinchu (TW); I-Min Lu, Taipei (TW); I-Wei Wu, Hsinchu (TW)

(73) Assignee: Toppoly Optoelectronics Corp. (TW)

( * ) Notice: Subject to any disclaimer, the term of this patent is extended or adjusted under 35 U.S.C. 154(b) by 137 days.

(21) Appl. No.: 10/161,301

(22) Filed: Jun. 3, 2002

(65) Prior Publication Data

US 2003/0169394 A1 Sep. 11, 2003

(30) Foreign Application Priority Data

Mar. 7, 2002 (TW) ........................... 91104322 A

(51) Int. Cl.⁷ .............................................. G02F 1/136
(52) U.S. Cl. ............................................ 349/43; 438/30
(58) Field of Search ...................... 349/43, 42; 438/30

(56) References Cited

U.S. PATENT DOCUMENTS

| | | | |
|---|---|---|---|
| 5,580,801 A | * 12/1996 | Maegawa et al. | 438/164 |
| 5,595,923 A | * 1/1997 | Zhang et al. | 438/162 |
| 5,614,426 A | * 3/1997 | Funada et al. | 438/150 |
| 5,783,468 A | * 7/1998 | Zhang et al. | 438/166 |
| 6,576,504 B2 | * 6/2003 | Ohtani et al. | 438/152 |

\* cited by examiner

*Primary Examiner*—Tarifor R. Chowdhury
*Assistant Examiner*—David Y Chung
(74) *Attorney, Agent, or Firm*—Baker Botts LLP

(57) ABSTRACT

A six mask-steps method for fabricating liquid crystal display is described. A driving area and a pixel area are defined by a first mask step. Gates on the driving/pixel area and upper electrodes of capacitors on the pixel area are defined by a second mask step. Then, using the gates and the upper electrodes as a mask, a source/drain, channel region and lower electrode are formed in the driving/pixel area by an ion-doping process. A second insulation layer is formed and covers the insulation substrate. A plurality of first openings is formed by the third mask step and the gate and the source/drain are exposed. A second conductive layer is formed and covers the second insulation layer and the first opening is filled. Then, the second conductive layer is patterned, and a source/drain line is formed and contacts electrically with the source/drain by the fourth mask step. A dielectric layer is formed and covers the second insulation layer and the second conductive layer; the dielectric layer has a planar surface. A second opening is formed by the fifth mask step and the drain line on the pixel area is exposed. Finally, a pixel electrode is defined by the sixth mask step and contacts electrically with the drain line.

14 Claims, 2 Drawing Sheets

METHOD FOR FABRICATING LIQUID CRYSTAL DISPLAY

BACKGROUND OF THE INVENTION

1. Field of Invention

The present invention relates to a liquid crystal display fabrication method. More particularly, the present invention relates to decrease the number of the mask used in the fabrication process, such that only six mask steps are required for completing the manufacture of the drive area and pixel area.

2. Description of Related Art

A low temperature polycrystalline silicon (LTPS) manufacturing process is used to fabricate thin film transistor liquid crystal display (TFT-LCD). Because the electron migration rate in polysilicon is faster than in amorphous silicon, the resolution of the LTPS TFT-LCD increases and quality is better. There are two parts of a TFT-LCD; one is the driving area and the other is the pixel area. The driving ICs are located on the driving area and the driving ICs must be made from polysilicon. In traditional amorphous TFT-LCD manufacture processes, only the pixel electrodes on the pixel area are formed. The driving ICs are bought and plastered on the driving area. The low temperature polycrystalline silicon manufacture process makes forming the pixel electrode and driving ICs simultaneously possible.

Use of the low temperature polycrystalline silicon manufacturing process to form the pixel electrode and driving ICs simultaneously is disclosed in U.S. Pat. No. 6,140,162, but twelve masks are employed in this manufacture process. More mask steps mean that the fabrication cost is higher. In fact, the cost of the twelve mask-process will be several times higher than the cost of the amorphous TFT-LCD manufacture process. The competitivity of the LTPS TFT-LCD will decrease. Therefore, the present invention provides a method of decreasing the number of the mask used in the fabrication process. Only six mask steps are required for completing the manufacture of the drive are and pixel area. The cost for producing an LTPS TFT-LCD will decrease and the competitivity of the LTPS TFT-LCD will increase.

SUMMARY OF THE INVENTION

It is therefore an objective of the present invention to provide a liquid crystal display fabrication method in which only six mask steps are used in the fabrication process.

It is another an objective of the present invention to provide a liquid crystal display fabrication method to lower the cost for producing an LTPS TFT-LCD and raise the competitivity of the LTPS TFT-LCD.

It is still another an objective of the present invention to provide a liquid crystal display fabrication method in which a self-aligned process is used to define the source/drain region and channel region to lower the number of masks used in the manufacturing process.

In accordance with the foregoing and other objectives of the present invention, a method for decreasing the mask number of the manufacture process for producing an LTPS TFT-LCD is provided. An insulation substrate is provided and a buffer layer is formed on the insulation substrate. Then, a polysilicon layer is formed on the buffer layer. The polysilicon layer is defined and a driving area and a pixel area are formed. A first insulation layer is formed and covers the polysilicon layer. A patterned conductive layer is formed on the driving area and the pixel area in which the patterned conductive layer serves as gates and upper electrodes of capacitors.

Thereafter, using the patterned conductive layer as a mask, a source/drain, channel region and lower electrode are formed in the polysilicon layer by an ion-doping process. A second insulation layer is formed and covers the insulation substrate. A plurality of first openings is formed and the gate and the source/drain are exposed. A second conductive layer is formed and covers the second insulation layer and the first opening is filled. Then, the second conductive layer is patterned, and a source/drain line is formed and contacts electrically with the source/drain. A dielectric layer is formed and covers the second insulation layer and the second conductive layer; the dielectric layer has a planar surface. A second opening is formed and the drain line on the pixel area is exposed. Finally, a pixel electrode is formed and contacts electrically with the drain line.

In conclusion, the invention allows only six mask steps are needed in the manufacture process of the LTPS TFT-LCD. The cost for producing an LTPS TFT-LCD decreases and competitivity of the LTPS TFT-LCD will increase.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the preferred embodiment, with reference made to the accompanying drawings as follows.

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
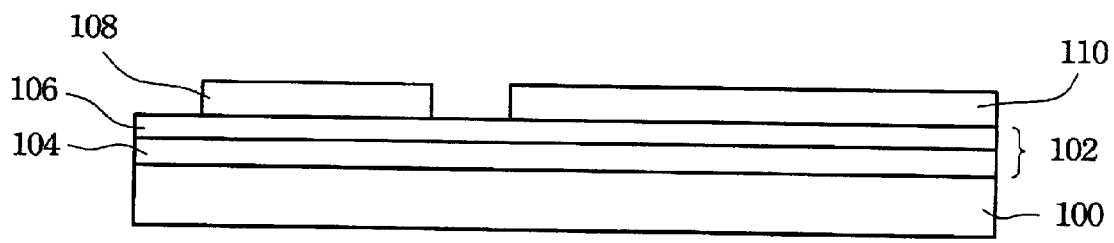
FIG. 1 is a schematic, cross-sectional diagram showing the first mask step of the manufacture process for producing an LTPS TFT-LCD.

Reference will now be made in detail to the present preferred embodiments of the invention, examples of which are illustrated in the accompanying drawings. Wherever possible, the same reference numbers are used in the drawings and the description to refer to the same or like parts.

FIGS. 1 to 6 are schematic, cross-sectional diagrams showing processes disclosed in the present invention for fabricating a LTPS TFT-LCD in which only six mask steps are needed. The driving ICs and the pixel electrodes can be formed simultaneously.

Reference is made to FIG. 1. FIG. 1 is a schematic, cross-sectional diagram showing the first mask step of the manufacture process for producing an LTPS TFT-LCD. An insulation substrate 100 is provided and a buffer layer 102 is formed on the insulation substrate 100. The insulation substrate 100 sequentially comprises a nitride layer 104 and an oxide layer 106. Then, an amorphous silicon layer (not shown in the figure) is formed on the buffer layer 102. The method for forming the amorphous layer comprises chemical vapor deposition. The amorphous silicon layer is transformed into a polysilicon layer (not shown in the figure) by a laser low temperature annealing process. This process also can be performed after the first mask step is executed.

A photoresist layer (not shown in the figure) is formed on the polysilicon layer by a spin-coating process. The photoresist layer is patterned and is used as mask and the polysilicon layer is etched and a first active area and a second active area are formed. The first active area is a driving area 108 and the second active area is a pixel area 110.

Figure 2:
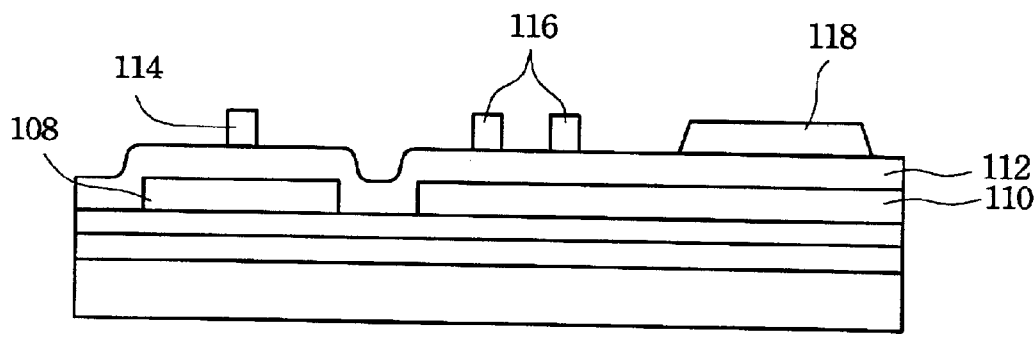
FIG. 2 is a schematic, cross-sectional diagram showing the second mask step of the manufacture process for producing an LTPS TFT-LCD.

Reference is made to FIG. 2. FIG. 2 is a schematic, cross-sectional diagram showing the second mask step of the manufacture process for producing an LTPS TFT-LCD. An insulation layer 112 is formed and conformally covers the driving area 108 and the pixel area 110. The material for forming the insulation layer 112 is silicon oxide or metal oxide. A conductive layer (not shown in the figure) is formed on the insulation layer 112; the material for forming the conductive layer is polysilicon. A photoresist layer (not shown in the figure) is formed on the conductive layer by a spin-coating process. The photoresist layer is patterned and is used as mask, the conductive layer is etched, gate 114 is formed on the driving area 108 and gate 116, and upper electrode 118 of a capacitor is formed on the pixel area 110.

Figure 3:
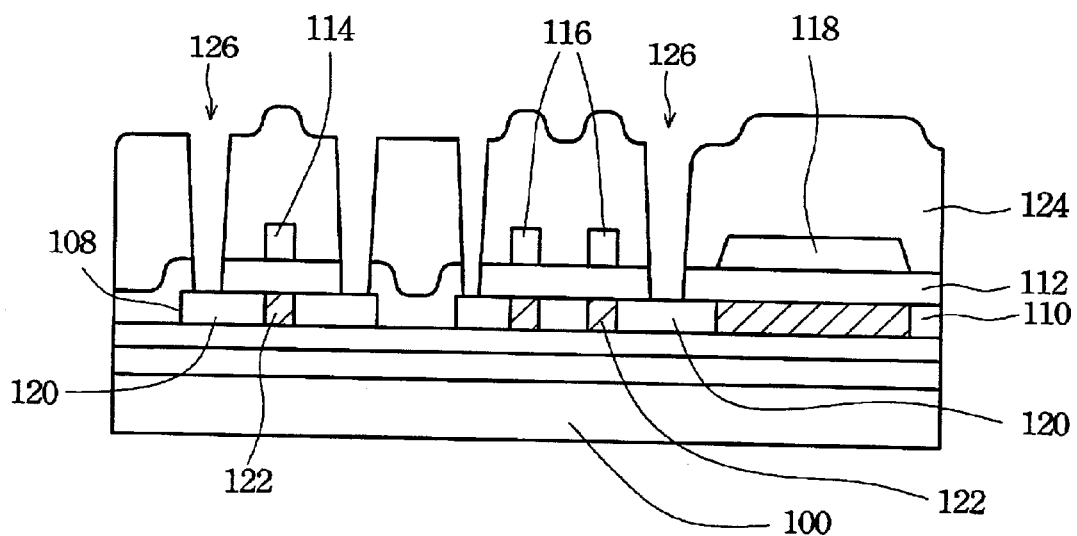
FIG. 3 is a schematic, cross-sectional diagram showing the third mask step of the manufacture process for producing an LTPS TFT-LCD.

Reference is made to FIG. 3. FIG. 3 is a schematic, cross-sectional diagram showing the third mask step of the manufacture process for producing an LTPS TFT-LCD. The gate 114, 116 and the upper electrode 118 are used as a mask, and source/drain 120, channel region 122 and bottom electrode 119 are formed in the polysilicon layer by an ion-doping process. The ions for the ion-doped process are P-type ions, such as boron ions, and the concentration of the dopant is between about 10E19 and 10E21 ions/cm$^3$.

With further reference to FIG. 3, after the ion-doped process is complete, an insulation layer 124 is formed and covers all the features on the insulation substrate 100. The material for forming the insulation layer 124 is silicon oxide, silicon nitride or other insulation material. A photoresist layer (not shown in the figure) is formed on the insulation layer 124 by spin-coating process. The photoresist layer is patterned and is used as mask, a plurality of opening 126 is formed by etching the insulation layer 112, 124 and the surface of the source/drain 120 is exposed.

Figure 4:
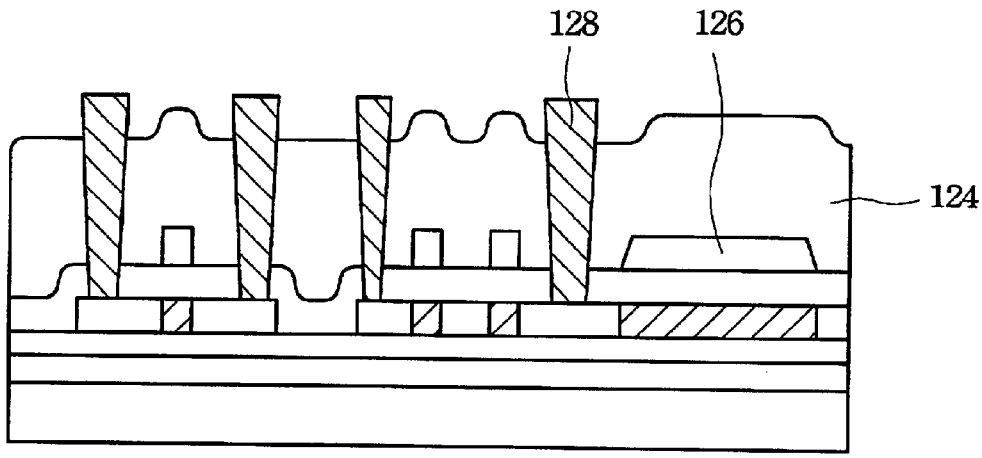
FIG. 4 is a schematic, cross-sectional diagram showing the fourth mask step of the manufacture process for producing an LTPS TFT-LCD.

Reference is made to FIG. 4. FIG. 4 is a schematic, cross-sectional diagram showing the fourth mask step of the manufacture process for producing an LTPS TFT-LCD. A conductive layer (not shown in the figure) is formed and covers the second insulation layer 124 and the openings 126 are filled. The material for forming the conductive layer comprises metal, polysilicon and doped polysilicon. A photoresist layer (not shown in the figure) is formed on the conductive layer by a spin-coating process. The photoresist layer is patterned and is used as mask, and source/drain lines 128 are formed in the opening 126 and contact electrically with the source/drain 120.

Figure 5:
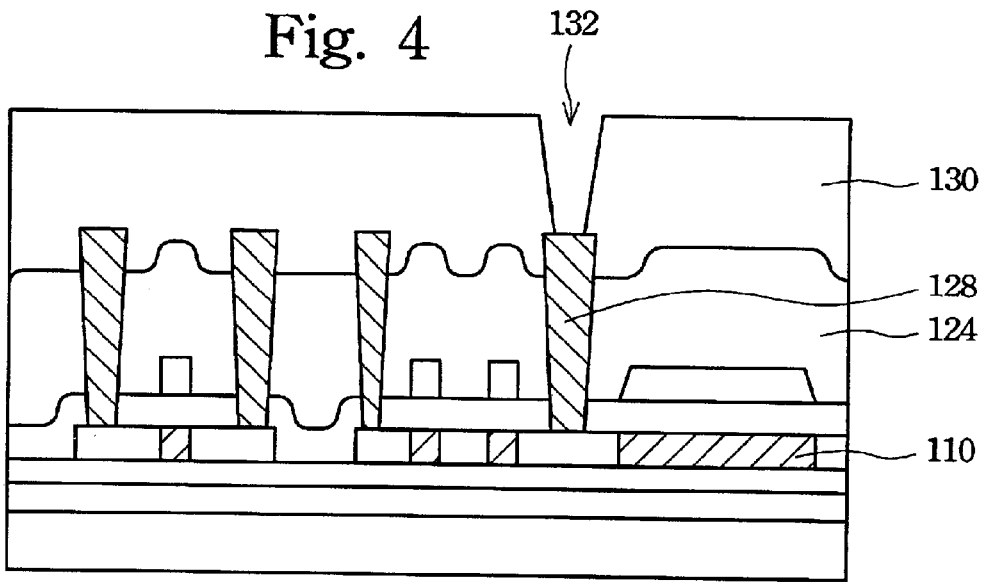
FIG. 5 is a schematic, cross-sectional diagram showing the fifth mask step of the manufacture process for producing an LTPS TFT-LCD.

Reference is made to FIG. 5. FIG. 5 is a schematic, cross-sectional diagram showing the fifth mask step of the manufacture process for producing an LTPS TFT-LCD. A dielectric layer 130 is formed and covers the insulation layer 124 and the source/drain lines 128; the dielectric layer 130 has a planar surface. A photoresist layer (not shown in the figure) is formed on the conductive layer by a spin-coating process. The photoresist layer is patterned and is used as mask, opening 132 is formed by etching the insulation layer 130 and the drain line 128 on the pixel area 110 is exposed.

Figure 6:
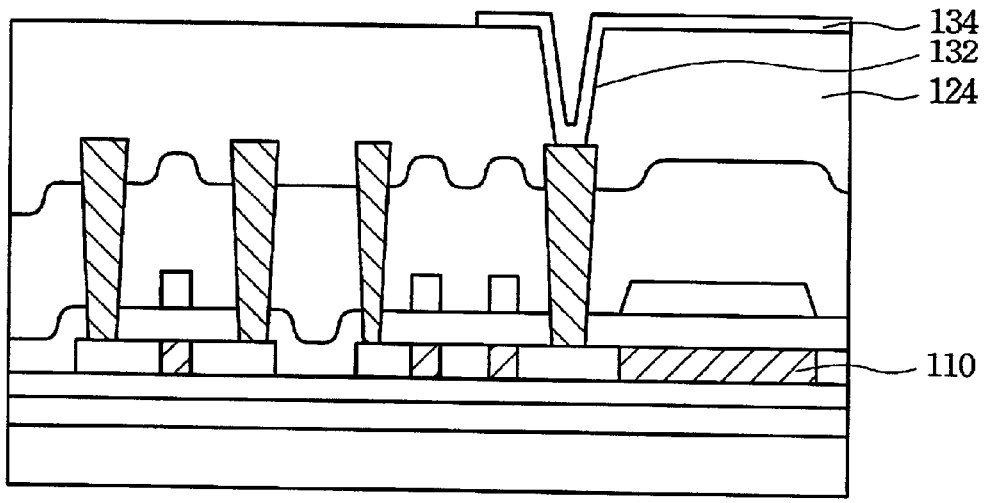
FIG. 6 is a schematic, cross-sectional diagram showing the sixth mask step of the manufacture process for producing an LTPS TFT-LCD according to one preferred embodiment of this invention.

Reference is made to FIG. 6. FIG. 6 is a schematic, cross-sectional diagram showing the sixth mask step of the manufacture process for producing an LTPS TFT-LCD. An indium-tin oxide layer (not shown in the figure) is formed conformally on the insulation layer 130 and in the opening 132. A photoresist layer (not shown in the figure) is formed on the conductive layer by a spin-coating process. The photoresist layer is patterned and is used as mask, a pixel electrode 134 is formed by etching the indium-tin oxide layer and contacts electrically with the drain line 128.

As embodied and broadly described herein, the invention provides a method which only requires six mask-steps for fabricating a liquid crystal display. Furthermore, between the second mask and the third mask, a self-aligned process is introduced to define the source/drain region and channel region, and so the mask number for the manufacture process us decreased. Therefore, the cost for producing an LTPS TFT-LCD will decrease and the competitivity of the LTPS TFT-LCD will increase.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for fabricating liquid crystal display, comprising:

providing an insulation substrate;

forming a buffer layer on the insulation substrate;

forming an amorphous silicon layer on the buffer layer;

transforming the amorphous silicon layer into a polysilicon layer by laser low temperature annealing;

forming a first active area and a second active area by defining the polysilicon layer, wherein the first active area is a driving area and the second active area is a pixel area;

forming a first insulation layer covering the polysilicon layer;

forming a patterned conductive layer on the driving area and the pixel layer, wherein the patterned conductive layer serves as gates and upper electrodes of capacitors;

using the patterned conductive layer as a mask, forming a source/drain, channel region and lower electrode in the polysilicon layer by an ion-doping process;

forming a second insulation layer covering the insulation substrate;

forming a plurality of first openings and exposing the gate and the source/drain;

forming a second conductive layer to cover the second insulation layer and fill the first opening;

patterning the second conductive layer to form a source/drain line contacting electrically with the source/drain;

forming a dielectric layer covering the second insulation layer and the second conductive layer, wherein the dielectric layer has a planar surface;

forming a second opening, wherein the drain line on the pixel area is exposed; and forming a pixel electrode connecting electrically with the drain line.

2. The method of claim 1, wherein the ion-doping process is a P-type ion implantation.

3. The method of claim 2, wherein an ion concentration formed by the P-type ion implantation is about between about 10E19 and 10E21 ions/cm$^3$.

4. The method of claim 1, wherein the buffer layer sequentially comprises a nitride layer and an oxide layer.

5. The method of claim 1, wherein the pixel electrode is made from ITO glass.

6. The method of claim 1, wherein a bottom electrode is defined by the ion-doping process.

7. A method for fabricating liquid crystal display, the method being adapted for fabrication on an insulation substrate, the method comprising:

forming a polysilicon layer on the insulation substrate;

forming a first active area and a second active area by defining the polysilicon layer;

forming a first insulation layer covering the polysilicon layer;

forming a patterned conductive layer on the first insulation layer, wherein the patterned conductive layer serves as gates and upper electrodes of capacitors;

using the patterned conductive layer as a mask, forming a source/drain and channel region in the polysilicon layer by a P-type ion-doping process;

forming a second insulation layer covering the insulation substrate;

forming a plurality of first openings and exposing the gate and the source/drain;

forming a source line and a drain line, wherein the source line contacts electrically with the source and the drain line contacts electrically with the drain;

forming a dielectric layer covering the second insulation layer and the source/drain lines, wherein the dielectric layer has a planar surface;

forming a second opening, wherein a drain line on the second active area is exposed; and forming a pixel electrode contacting electrically with the drain line on the second active area.

8. The method of claim 7, wherein the first active area is a driving area and the second active area is a pixel area.

9. The method of claim 7, further comprising a buffer layer formed before the polysilicon layer formed.

10. The method of claim 7, wherein a method for forming the polysilicon layer comprises:

forming an amorphous poly layer on the buffer layer; and transforming the amorphous poly layer into the polysilicon layer by laser low temperature annealing.

11. The method of claim 7, wherein an ion concentration formed by the P-type ion implantation is about between about 10E19 and 10E21 ions/cm$^3$.

12. The method of claim 7, wherein a bottom electrode is defined by the ion-doping process.

13. The method of claim 7, wherein the buffer layer sequentially comprises a nitride layer and an oxide layer.

14. The method of claim 7, wherein the pixel electrode is made from ITO glass.

* * * * *